United States Patent [19]

Owechko

[11] Patent Number: 5,105,380
[45] Date of Patent: Apr. 14, 1992

[54] ELECTRO-OPTIC CHANNELIZED MODULATOR AND RECEIVER

[75] Inventor: Yuri Owechko, Newbury Park, Calif.

[73] Assignee: Hughes Aircraft Company, Los Angeles, Calif.

[21] Appl. No.: 446,838

[22] Filed: Dec. 6, 1989

[51] Int. Cl.$^5$ .................. G06G 7/02; G02B 27/42
[52] U.S. Cl. ................... 364/825; 364/822; 364/827; 359/245
[58] Field of Search ............ 364/807, 822, 825, 827, 364/837, 845; 350/3.68, 162.12, 353, 355, 356, 96.14, 96.16, 1, 29, 107, 559, 560, 561

[56] References Cited

U.S. PATENT DOCUMENTS

| | | | |
|---|---|---|---|
| 4,468,766 | 8/1984 | Spezio | 370/3 |
| 4,603,398 | 7/1986 | Bocker et al. | 364/837 |
| 4,620,290 | 10/1986 | Constant | 359/560 |
| 4,712,059 | 12/1987 | Labrum | 359/560 |
| 4,747,069 | 5/1988 | Grinberg et al. | 364/807 |
| 4,843,587 | 6/1989 | Schlunt et al. | 364/822 |
| 4,862,115 | 8/1989 | Lee et al. | 364/822 |
| 4,871,232 | 10/1989 | Grinberg et al. | 350/162.11 |
| 4,892,370 | 1/1990 | Lee | 350/162.12 |
| 4,962,382 | 10/1990 | Lee | 359/559 |
| 4,976,520 | 12/1990 | Brandstetter et al. | 364/822 |

OTHER PUBLICATIONS

John E. Lee, "Acousto-Optic Signal Processing", Marcel Dekker, Inc., pp. 87-107 (1983).
P. Kellman and T. Bader, "Acousto-Optic Channelized Receivers", Optical Engineering 23(1) vol. 23 No. 1 (Jan./Feb. 1984), pp. 002-006.
R. E. Brooks, "Saw RF Spectrum Analyzer/Channelizer Using Acoustic Wave Diffraction", SPIE vol. 639, Optical Information Processing II, pp. 154-159 (1986).
EG&G Reticon Data Sheet, RT0032A Tapped Analog Delay, pp. 6-3 to 6-6.
Mergerian, D., Integrated Optical RF Spectrum Analyzer, Westinghouse Electric Corporation, Defense and Electronics Systems Center, Baltimore, MD, Technical Feature 9/1980, pp. 37-44.
Alexander, E. M., New Method of Coherent Frequency Channelization, EW Support Measures Branch, Tachtical Electronic Warefare Division, Naval Research Lab., Wash., D.C. pp. 228-231, date unknown.

Primary Examiner—Jerry Smith
Assistant Examiner—Jim Trammell
Attorney, Agent, or Firm—V. D. Duraiswamy; W. K. Denson-Low

[57] ABSTRACT

A wideband electrical input signal is applied to a tapped delay line to produce a spatial representation of the input signal distributed along the delay line taps. Inputs of individual elements of a linear electro-optic modulator array are connected to the respective delay line taps, such that the modulator array produces a spatial optical pattern in which the transmittance varies in accordance with the amplitude of the input signal. A laser directs a coherent light beam through the modulator array for modulation by the optical pattern. A Fourier transform lens transforms the modulated light beam into a spatial light distribution pattern in which the light intensity varies in accordance with the amplitudes of the frequency components in the input signal. A photodetector array produces channelized electrical outputs corresponding to portions of the light distribution pattern which themselves correspond to respective ranges of frequencies in the input signal.

19 Claims, 2 Drawing Sheets

ELECTRO-OPTIC CHANNELIZED MODULATOR AND RECEIVER

BACKGROUND OF THE INVENTION

1. Field of the Invention

The present invention generally relates to the separation of a wide band electrical input signal into individual frequency channels, and more specifically to an electro-optic modulator which may be advantageously incorporated into a wide band channelized receiver.

2. Description of the Related Art

Electronic spectrum analyzers and channelized receivers or demultiplexers are similar in principle in that they separate a wide band input signal into individual channels corresponding to discrete frequency ranges within the bandwidth of the input signal. A simplified electronic equivalent of such a device would consist of a plurality of bandpass filters connected in parallel, each designed to pass frequency components of the input signal within a particular frequency range therethrough. Spectrum analyzers are generally constructed to produce a plot of signal amplitude vs. frequency on a cathode ray tube or other display device. Channelized receivers or demultiplexers are used to separate a wideband composite input signal including carriers of different frequencies which are individually amplitude or otherwise modulated with information into separate electronic channels.

Although the separation of an input signal into individual frequency components or channels is relatively straightforward in principle, a variety of diverse methods of accomplishing this function in actual practice have been proposed in the prior art. Superheterodyne receiver circuits, which form the basis for most broadcast radio receivers, have been adapted to sweep across a specified frequency band and intercept signals at individual frequencies which may exist in the band. However, this method is only capable of detecting one frequency at a time, and the intercept probability can be very low for intermittent signals. Compressive filters may be incorporated into superheterodyne spectrum analyzers to increase the intercept probability.

The crystal video spectrum analyzer is the modern version of the crystal set, and includes a broadband filter and crystal detector which detects any signal within the input filter width. These analyzers have poor sensitivity and frequency resolution, and do not provide any frequency information in their basic form. However, discriminator techniques may be incorporated into the design to provide a single frequency reading.

The receivers discussed above are basically single channel devices. Multi-channel receivers, which more closely relate to the present invention, have been developed which function in accordance with the parallel bandpass filter configuration discussed above. These receivers enable simultaneous reception of any number of frequency ranges with 100% intercept probability, and provide a separate reception channel corresponding to each frequency range. The obvious extension of this approach to simultaneous, multi-channel reception is to physically provide a bandpass filter for each channel. This is satisfactory where the number is channels is small, but impractical where separation of a large number of channels is required.

Channel separation may be advantageously performed by means of an acousto-optic modulator (AOM). This device and a channelized receiver in which it is incorporated is discussed in a textbook entitled "Acoustic-Optic Signal Processing", by N. Berg et al, Marcel Dekker, Inc., Chapt. 4, pp. 87–106. A presentation of the single channel analyzers discussed above is also found in this reference. The acousto-optic channelized receiver (AOCR) is also presented in a paper entitled "Acousto-optic channelized receivers", by P. Kellman et al, Optical Engineering, vol. 23, no. 1, (Jan./Feb. 1984).

In an acousto-optic receiver, a transparent ultrasonic delay line (Bragg cell) is utilized to convert a wideband electrical input signal into a proportional optical pattern by means of a travelling pressure wave. Spatial variation of the refractive index is used to modulate a coherent light beam from a laser, and the diffracted spectral components are separated by a lens. Fourier transformation of the input signal by the lens produces a light distribution in the focal plane of the lens. This light distribution is detected photoelectrically, producing a charge distribution proportional to the instantaneous power spectrum of the input signal. An array of photodetectors is used to generate charge at discrete positions.

An AOM functions by diffracting light at an angle which is determined by the spatial period and propagation direction of the travelling pressure waves and with an intensity proportional to the signal power. Although this device is capable of channelizing an input signal over a wide bandwidth using a relatively simple structure, its application is rather limited.

More specifically, the fixed acoustic velocity in an acousto-optic cell is an impediment to fine frequency resolution and programmability. The input signal is impressed on a carrier, and used to excite sound waves in a crystal. A coherent light beam incident on the crystal at the Bragg angle is diffracted by the sound waves and Fourier transformed by the lens. The spatial Fourier transform is integrated on a channelized detector array. The separation between adjacent channels on the detector array, or equivalently the frequency resolution of the acousto-optic cell, is limited by the transit time of acoustic waves across the cell aperture. The slowest available acoustic velocity is that for the slow shear wave in $TeO_2$, which is $6.2 \times 10^4$ cm/sec. For an exemplary 2 cm aperture, this corresponds to a frequency resolution of 31 KHz, which is insufficient to provide the necessary adjacent channel rejection ratio in many applications. Also, since the acoustic velocity is fixed, the channel widths cannot be changed without physically changing the detector or lens. Other problems inherent in AOMs involve distortion due to spatial attenuation of the acoustic waves, and critical alignment requirements.

Another type of channelized receiver is known as a Surface Acoustic Wave (SAW) receiver, and is presented in a paper entitled "SAW RF SPECTRUM ANALYZER/CHANNELIZER USING ACOUSTIC WAVE DIFFRACTION", by R. Brooks, SPIE vol. 639 Optical Information Processing II, pp. 154–159 (1986). In this device, an RF signal to be analyzed drives a phased array of SAW interdigital transducers which acts like a curved diffraction grating to focus and angularly disperse the generated acoustic waves with frequency. An array of output transducers partitions the dispersed signal spectrum into contiguous narrow bands.

The SAW device differs from the AOM in that no light is involved, and the propagating waves are generated directly from the input signal, rather than by modulating waves from an external source. However, SAW modulators have the same drawbacks as AOMs in that they are limited in flexibility and programmability.

Yet another type of channelized receiver is disclosed in U.S. Pat. No. 4,468,766, issued Aug. 28, 1984, entitled "OPTICAL RF DOWNCONVERTER", to A. Spezio. This reference teaches how to separate a wide bandwidth optical signal into frequency channels utilizing a set of diffraction gratings.

SUMMARY OF THE INVENTION

The present invention provides an electro-optic modulator, and an electro-optic channelized receiver which incorporates the modulator as a main component thereof, which is capable of resolving very closely spaced frequency channels in a programmable manner. The invention overcomes the drawbacks of the prior art acousto-optic modulator by replacing the acoustic Bragg cell with a tapped delay line and electro-optic modulator array, which cooperate to produce a spatial transmittance pattern corresponding to a temporal electrical input signal, as opposed to selective diffraction from travelling pressure waves as in an acousto-optic modulator. The transmittance pattern is used to modulate a laser beam, which is Fourier transformed by a lens. A photodetector array samples the resultant frequency spectrum and separates the channels into parallel output lines. Many of the distortions present in acousto-optic modulators such as acoustic attenuation are eliminated by the present invention. In addition, the invention enables complete clocking flexibility and programming of channel positions, unlike acousto-optic systems which are tied to a fixed acoustic velocity and limited delay times. The present channelized receiver is capable of processing frequency multiplexed signals in real-time, and in a programmable manner.

In accordance with the present invention, a wideband electrical input signal is applied to a tapped delay line to produce a spatial representation of the input signal distributed along the delay line taps. Inputs of individual elements of a linear electro-optic modulator array are connected to the respective delay line taps, such that the modulator array produces a spatial optical pattern in which the transmittance varies in accordance with the amplitude of the input signal. A laser directs a coherent light beam through the modulator array for modulation by the optical pattern. A Fourier transform lens transforms the modulated light beam into a spatial light distribution pattern in which the light intensity varies in accordance with the amplitudes of the frequency components in the input signal. A photodetector array produces channelized electrical outputs corresponding to portions of the light distribution pattern which themselves correspond to respective ranges of frequencies in the input signal.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 2b is a diagram illustrating optical signal and noise transmission through the modulator array of FIG. 2a.

DETAILED DESCRIPTION OF THE INVENTION

Figure 1:
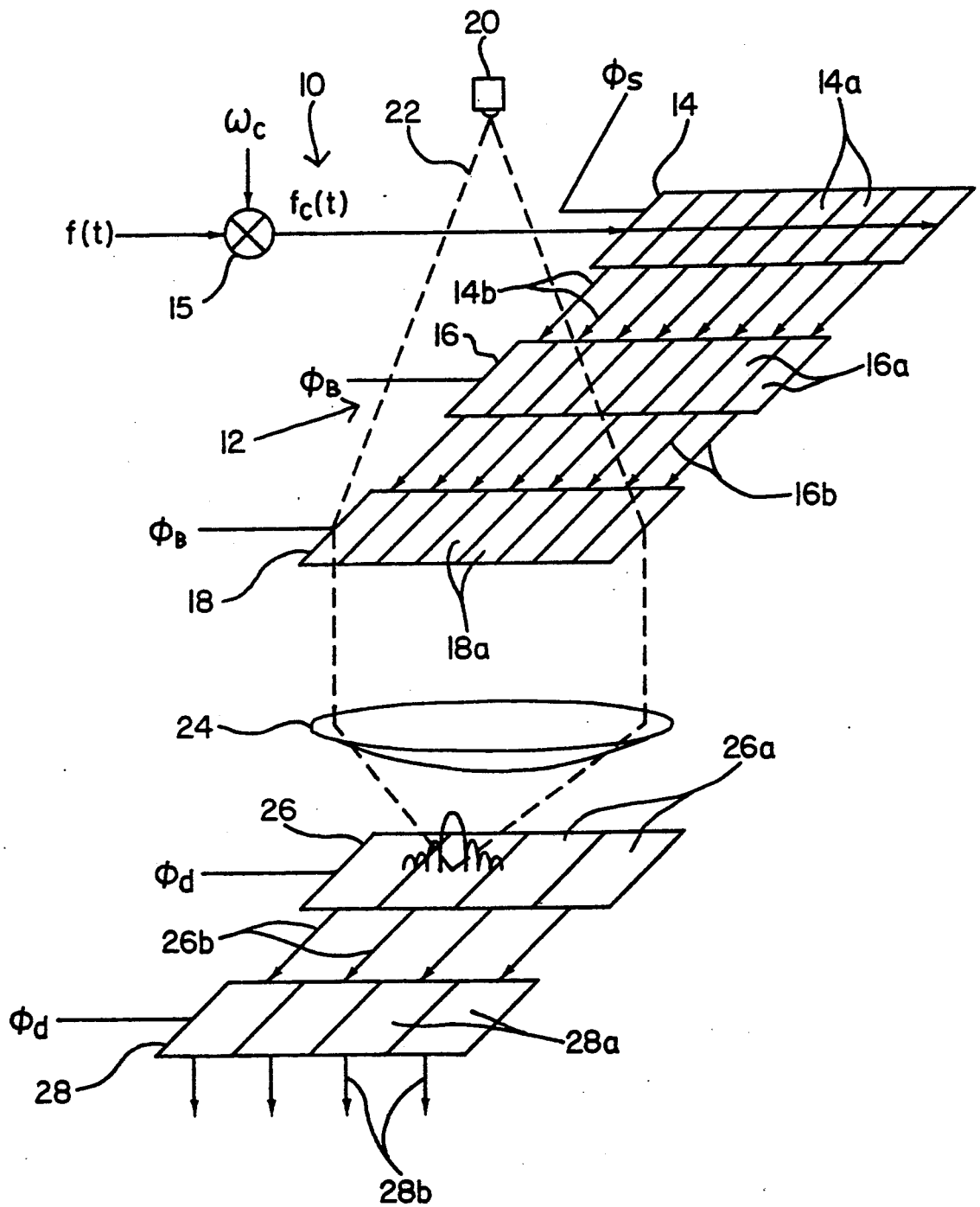
FIG. 1 is a schematic diagram of an electro-optic channelized receiver embodying the present invention.

Referring to FIG. 1 of the drawing, an electro-optic channelized receiver (EOCR) is generally designated as 10, and includes an electro-optic modulator (EOM) 12 as an integral part thereof. The modulator 12 includes a high speed electronic tapped delay line 14 in the form of a linear array of delay elements 14a. A wideband temporal electrical input signal f(t) is applied through a mixer 15 to an input of the delay line 14, and propagates therethrough in such a manner that the temporal amplitude distribution of the input signal is converted into a spatial amplitude distribution in the line 14. The mixer 15 shifts the center frequency of the signal f(t) so that the total spectral width of a signal $f_c(t)$ produced at the output of the mixer 15 is equal to the active signal bandwidth B. Where the bandwidth of the signal f(t) is centered about a frequency $\omega_c$, the mixer 15 mixes the input signal f(t) with a locally generated signal at the frequency $\omega_c$ to produce the signal $f_c(t)$ as a difference frequency signal with the center frequency component $\omega_c$ removed.

The individual elements 14a of the array 14 produce parallel outputs 14b which constitute the taps of the delay line 14, and are connected to respective inputs of memory elements 16a of a linear buffer memory array 16. Parallel outputs 16b of the memory array 16 are connected to inputs of elements 18a of a linear electro-optic modulator array 18.

A laser 20, which may be in the form of a laser diode array, produces and directs a coherent light beam 22 through the modulator array 18. Although symbolically shown in the drawing as emanating from the laser 20 as a point and diverging therefrom, the light beam 22 is preferably in the form of a collimated line rather than a circular spot, is coextensive with the modulator array 18, and may have any suitable wavelength within or outside of the visible spectrum, including infrared or ultraviolet radiation.

The array 18 produces a linear spatial optical transmittance pattern which corresponds to the spatial amplitude distribution in the delay line 14, and optically modulates the light beam 22. An optical element, which may be advantageously embodied as a converging lens 24, produces a Fourier transformation of the modulated light beam to produce a spatial light distribution pattern in which the light intensity varies in accordance with the amplitude of the frequency distribution in the input signal $f_c(t)$. The lens 24 directs the light distribution pattern onto a linear photodetector array 26 which includes a plurality of contiguous photodetector elements 26a which, in combination, are coextensive with the light distribution pattern produced by the lens 24. Outputs 26b of the photodetector array 26 are connected to respective inputs of elements 28a of a linear buffer memory array 28. Outputs 28b of the array 28 constitute output channels of the receiver 10. Clock pulses $\phi s$ are applied to the tapped delay line 14, clock pulses $\phi B$ are applied to the arrays 16 and 18, and clock pulses $\phi d$ are applied to the arrays 26 and 28.

The delay line 14 may be analog, including, for example, an array of cascaded charge coupled devices (CCD), or may be in the form of a digital shift register. The bandwidth of the delay line 14 is selected to be B, and is programmable by means of adjusting the clocking or sampling rate of the line 14. Assuming that N channels are to be resolved within the bandwidth B, the Nyquist criterion requires that a minimum of 2N elements be provided in each of the arrays 14, 16, and 18. However, since the Nyquist criterion applies to sampling rather than channelizing, only one photodetector element 26a need be provided for each receiver output channel, for a total of N elements 26a and 28a.

The lens 24 Fourier transforms the spatial transmittance distribution in the modulator array 18, to produce the light distribution which is incident on the photodetector array 26. The array 26 converts the optical input into a set of parallel output channels, each of which contains a different spectral component range of $f_c(t)$, thereby performing frequency demultiplexing. Because of the pipelined flow of data made possible by the buffer memory array 16, the bandwidth required of each element 18a of the modulator array 18 is B/N, the channel bandwidth, rather than B, the total active bandwidth of $f_c(t)$.

The operation of the receiver 10 may be understood in more detail by considering the signal $f_c(t)$ as consisting of a single high frequency sine wave carrier at a frequency F. Assume that the carrier is amplitude modulated by a signal of bandwidth B/N. The high frequency carrier is displayed spatially on the modulator array 18, converting it into the spatial domain with a frame time of 2N/B seconds. It is then Fourier transformed by the lens 24, resulting in a spot on the detector array 26 corresponding to the carrier frequency F.

The width of the spot, which is proportional to the channel bandwidth B/N, is matched to the width of the photodetector elements 26a. If the carrier frequency F is changed, the spatial variations in the modulator array 18 correspondingly change, so that the spot changes position on the photodetector array 26. As the carrier is amplitude modulated by the signal, the intensity of the spot varies accordingly, so that the data is reproduced on the output channel 28b connected to the detector element 26a through the respective buffer memory array element 28a.

The optical channel signal is integrated by the elements 26b of the photodetector array 26 while the next frame is being clocked in, so the bandwidth of the modulator elements 18a (two elements per channel) only have to accommodate the channel bandwidth B/N, rather than the full active bandwidth B. If many carriers are present simultaneously, the lens 24 will Fourier transform them all in parallel. Since the clocking rate of data through the modulator array 18 is completely flexible, the total bandwidth B and the channel bandwidth B/N can be set to arbitrary values and varied dynamically by programming. The center frequency can be adjusted from 0 to B by mixing a reference signal with the input signal. An important feature of the present invention is that the delay time, or time aperture of the modulator 18, can be set to large values which result in fine frequency resolution and superior suppression of crosstalk between adjacent narrowband channels.

The tapped delay line 14 may be constructed from commercially available elements, such as a plurality of Reticon RT0032A Tapped Analog Delay modules, manufactured by EG&G, of Sunnyvale, CA, connected in cascade. The RT0032 is a 32 stage CCD device which permits the storage of analog signals with recovery of the signals at multiple separate outputs at successive delay times later. The taps on each stage are brought to the outside through buffer amplifiers. Each buffer amplifier output appears as a source follower, thus permitting variable loading of the taps in order to create various tap-weight functions. An additional feedforward tap is provided so that multiple devices may be cascaded without causing discontinuity in the spacing of the taps from one device to the next. This particular module provides the features necessary for embodiment of the present tapped delay line 14.

Although not illustrated, additions may be made to the present channelized receiver 10 to provide desired functions. Two parallel lenses and detector arrays may be provided to demultiplex narrow and wideband channels simultaneously. Phase information may be extracted by interference of the optical signal with a coherent reference beam at the photodetector. The latter modification would also increase the dynamic range of the receiver since the detector output would then be proportional to the signal amplitude, rather than the square of the amplitude.

Another important feature of the present invention is the capability of real-time programming of apodization windows and nonlinear compensation of the input signal. This may be accomplished by providing fixed or adjustable weighting resistors in the delay line taps 14b, or digital programming of the taps by means of lookup tables. The lookup tables can be programmed in any desired manner for weighting or nonlinear transformations of the signal values in the delay line. Apodization, commonly used to reduce sidelobe levels, is easily implemented by programming the lookup tables as tap weights.

Figure 2A:
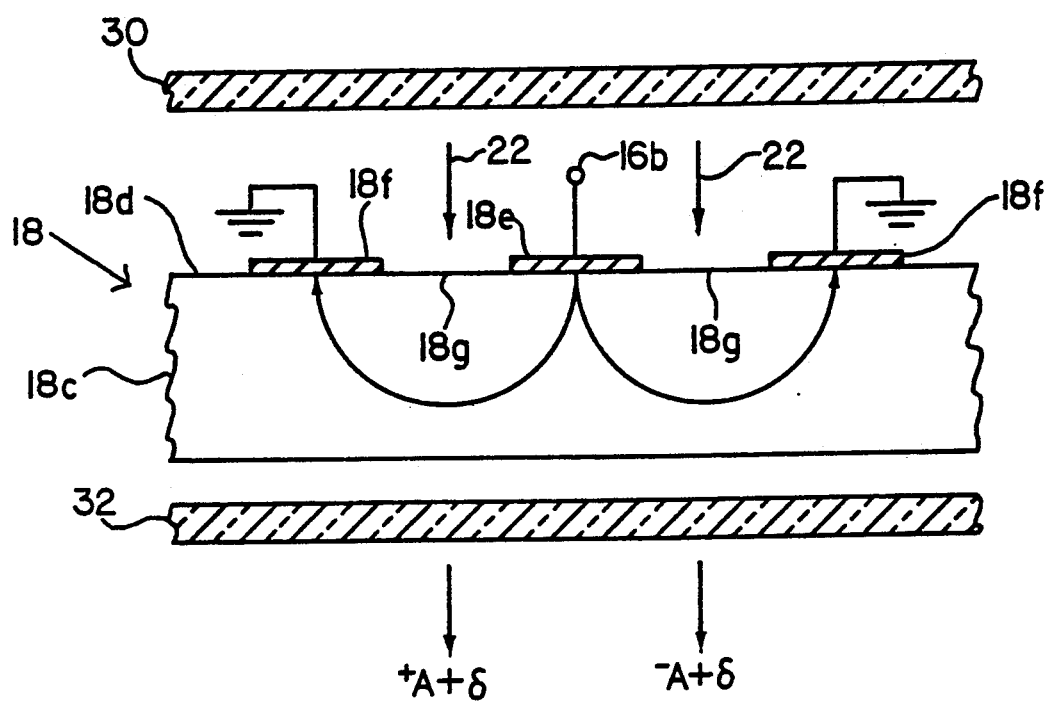
FIG. 2a is a fragmentary sectional view of an electro-optic modulator array of the invention.

FIG. 2a illustrates a preferred embodiment of the electro-optical modulator array 18, which includes a substantially transparent, electro-optic material 18c having a surface 18d which is oriented substantially perpendicular to the light beam 22. The material 18c, a preferred example of which is LiNbO₃, is selected to exhibit the transverse electric-optic effect. It will be noted, however, that the invention is not limited to this particular example, and may be practiced using an electro-optic modulator which produces an optical transmittance pattern by means of the longitudinal electro-optic effect or any other electro-optical effect, using any material and configuration.

Although only a portion of the modulator array 18 is shown in the drawing, the array 18 is elongated in the horizontal direction as viewed in FIG. 2a. A plurality of first electrodes 18e, and second electrodes 18f, made of aluminum, gold, or any other suitable electrically conductive material, are formed by deposition or the like on the surface 18d of the material 18c. The first electrodes 18e are connected to the respective outputs 16b of the buffer memory array elements 16a. The second electrodes 18f are commonly connected to a predetermined electrical potential, which may be ground. A space 18g is provided between each adjacent first electrode 18e and second electrode 18f. Each modulator element 18a of the array 18 includes one respective first electrode 18e in combination with the two adjacent second electrodes 18f.

The modulator array 18 further includes a crosspolarizer arrangement in the form of first and second polarizers 30 and 32 respectively. The polarizers 30 and 32 are shown as being disposed on opposite sides of the material 18c. However, the invention is not so limited.

The first polarizer 30 may be disposed at any location along the axis of the light beam 22 between the laser 20 and the material 18c. The polarizer 32 is disposed downstream of the material 18c, at any location along the axis of the light beam 22 between the material 18c and the photodetector array 26. The polarizers 30 and 32 are designed to polarize light passing therethrough at substantially 90° angles relative to each other.

The coherent light beam 22 from the laser 20 is polarized to a predetermined angle by the polarizer 30. The voltage applied to each first electrode 18e of the respective modulator element 18a creates an electric field between the first electrode 18e and adjacent second electrodes 18f which causes variation of the birefringent indices of refraction of the material 18c in the areas underlying the spaces 18g due to the transverse electro-optic effect. This results in a localized variation in the angle at which light is polarized while passing through the material 18c. Maximum transmittance is obtained where the electrical field produced by the signal on the electrode 18e causes the material 18c to rotate the polarization angle of light passing therethrough by 90° in order to coincide with the polarization angle of the polarizer 32. The transmittance decreases progressively as the polarization angle of the light emerging from the material 18c deviates from the polarization angle of the polarizer 32.

Figure 2B:
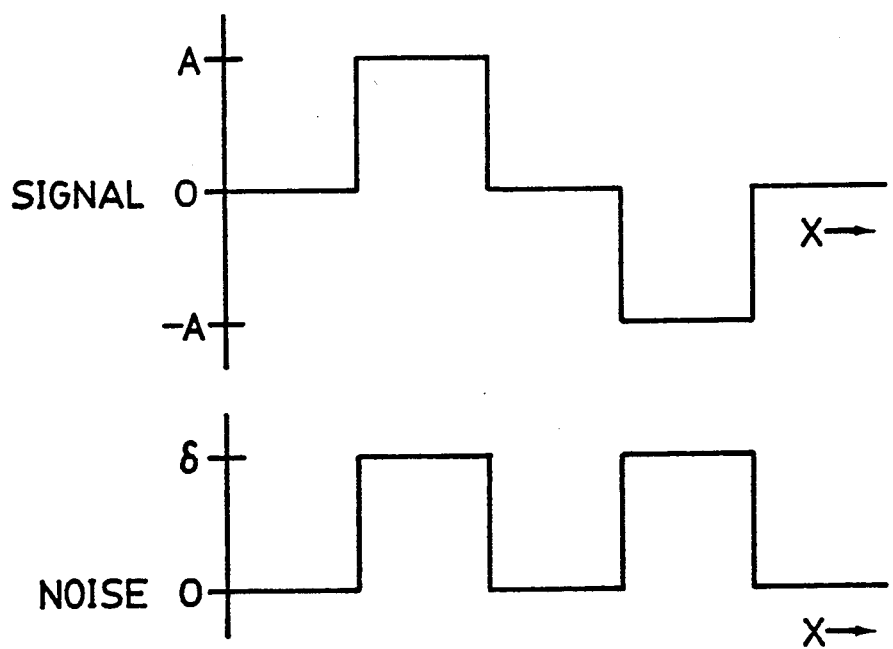

The alternating arrangement of the first and second electrodes 18e and 18f produces another advantage as illustrated in FIG. 2b. Since the transverse component of the electric field has opposite signs in the two spaces 18g, the fundamental spatial frequency component of the signal induced birefringence is half that of any optical noise caused by nonzero polarizer extinction or other sources of optical bias. Therefore, noise will be well separated spatially from the optical signal in the Fourier plane. Assuming that the spatial transmittance pattern in the modulator array 18 has an amplitude which varies between $+A$ and $-A$ along the longitudinal direction X of the array 18, and a corresponding optical noise component has an amplitude which varies between zero and $+\delta$, the noise component will be transformed into the Fourier plane at one-half the frequency of the signal component, at a position outside the bandwidth B and external of one end of the photodetector array 26.

The arrangement illustrated in FIG. 2a enables the construction of low voltage (5 to 10 V), low capacitance modulators using $LiNbO_3$ as the material 18c. The low voltage requirements enable the use of high speed electronic delay lines and drivers for high input bandwidths. Each element 18a includes the electrodes 18e and 18f electrodes deposited in the form of stripes on a $LiNbO_3$ crystal operating in the transverse electro-optic effect configuration, as shown in the drawing. The static birefringence of $LiNbO_3$, which would otherwise result in light leakage, can be cancelled with a compensatory birefringent crystal (not shown).

The signal-to-noise ratio is further enhanced by focussing the readout beam in one dimension onto the modulator array 18 to provide a large gain in signal level. As described above, the laser 20 may be in the form of a laser diode array which produces a linear light beam which is coextensive with the modulator array 18. A less desirable, but operative alternative, is to provide a laser which produces a light beam having a circular cross section, and a diameter which is at least equal to the length of the array 18. A modification of this expedient is to provide a laser which produces a beam having a circular cross section, with a diameter smaller than the length of the array 18, and enlarge the cross sectional area of the light beam using an optical beam expander. Where the laser produces a small circular or spot beam, a preferred method of embodying the invention is to enlarge the beam using a beam expander, and convert the circular beam into a linear beam using a cylindrical lens or other suitable means (not shown).

It has been determined that a channel width of 10 MHz is attainable in $LiNbO_3$, with a sampling time of 100 ns using a modulator input voltage of 5 V. The capacitance of test electrode structures was measured to be on the order of 10 pF. The reactive power required to drive 500 modulator elements at a channel width of 10 MHz is approximately 0.7 W. An electro-optic channelized receiver having this configuration is capable of separating an input signal into 250 contiguous frequency ranges or channels of 10 MHz each, for a total input bandwidth of 2.5 GHz. In this particular configuration, the clock pulses $\phi s$ are applied to the tapped delay line 14 at a frequency of 2B 2.5 GHz, whereas the clock pulses $\phi B$ and $\phi d$ are applied to the arrays 16, 18, 26, and 28 respectively at a frequency of $B/N=10$ MHz. Although 2.5 GHz is the maximum bandwidth for the assumed parameters, the bandwidth B can set to any lower value for increased frequency resolution by varying the sampling rate of the input delay line.

Due to the particular crystal symmetry of $LiNbO_3$, some phase distortion will occur in addition to the desired light amplitude modulation. However, this phase distortion is of second order, and for low input voltages is negligible. However, in applications where phase distortion of any magnitude is unacceptable, other materials such as $Bi_{12}SiO_{20}$ which do not exhibit this phenomenon can be substituted.

The buffer memory arrays 16 and 28 enhance the flexibility and programmability of the present EOCR, but may be omitted in certain applications if desired. The photodetector array 26 and buffer memory array 28 have been described as producing channelized outputs in parallel. However, it is within the scope of the invention to replace the buffer memory array 28 with a parallel-in, serial-out shift register in applications where a single output is desired. Another alternative is to omit the buffer memory array 28, and embody the photodetector array 26 as a serial or cascade output device.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. An electro-optic receiver, comprising:
   electro-optic modulator means responsive to a temporal amplitude distribution of an electrical input signal for producing a spatial optical pattern in which the transmittance varies in accordance with the temporal amplitude distribution of the input signal, said modulator means including a delay line;
   light source means for directing a coherent light bear through the modulator means for modulation by the optical pattern;

transformation means for performing Fourier transformation of the modulated light beam into a spatial light distribution pattern in which the light intensity varies in accordance with the amplitudes of the frequency components of the input signal; and photodetector means for receiving the light distribution pattern from the transformation means and producing electrical output signals corresponding thereto.

2. A receiver as in claim 1, in which:
the modulator means comprises means for producing a linear spatial optical pattern in response to the electrical input signal; and
the transformation means comprises means for transforming the modulated light beam into a linear spatial light distribution pattern;
the photodetector means including a linear photodetector array which is substantially coextensive with the linear spatial light distribution pattern.

3. A receiver as in claim 2, in which the photodetector array comprises a plurality of substantially contiguous photodetector elements for producing said electrical output signals corresponding to respective portions of the light distribution pattern incident thereon.

4. A receiver as in claim 3, in which the modulator means comprises:
a linear delay element array including a plurality of delay elements connected such that the input signal propagates sequentially therethrough; and
a linear electro-optic modulator array including a plurality of substantially contiguous electro-optic modulator elements having electrical inputs connected in circuit with electrical outputs of the delay elements respectively.

5. A receiver as in claim 4, in which the modulator means further comprises a linear buffer memory array including a plurality of memory elements, each of which is connected in circuit between a delay element and a modulator element respectively.

6. A receiver as in claim 4, in which the number of electro-optic modulator elements is an integral multiple of the number of photodetector elements.

7. A receiver as in claim 6, in which the integral multiple is at least two.

8. A receiver as in claim 4, in which the delay element array further comprises means for individually weighting the outputs of the delay elements.

9. A receiver as in claim 3, further comprising a linear buffer memory array including a plurality of memory elements, each having an input connected in circuit to receive the electrical output signal from one of the photodetector elements, and an output which constitutes an output channel of the receiver respectively.

10. A receiver as in claim 3, in which the transformation means comprises optical means for performing an optical Fourier transformation on the modulated light beam.

11. A receiver as in claim 10, in which the optical means comprises a converging lens.

12. An electro-optic receiver, comprising:
electro-optic modulator means responsive to a temporal electrical input signal for producing a spatial optical pattern in which the transmittance varies in accordance with the temporal amplitude distribution of the input signal;

light source means for directing a coherent light beam through the modulator means for modulation by the optical pattern;

transformation means for transforming the modulated light beam into a spatial light distribution pattern in which the light intensity varies in accordance with the amplitudes of the frequency components of the input signal; and photodetector means for receiving the light distribution pattern from the transformation means and producing electrical output signals corresponding thereto;

the modulator means comprising:
a linear delay element array including a plurality of delay elements connected such that the input signal propagates sequentially therethrough; and
a linear electro-optic modulator array which includes:
a plurality of substantially contiguous electro-optic modulator elements having electrical inputs connected in circuit with electrical outputs of the delay elements respectively;
first polarizer means disposed between the light source means and the modulator elements; and
second polarizer means disposed between the modulator elements and the photodetector means;
the first and second polarizer means polarizing the light beam at angles which are shifted substantially 90° relative to each other;
each modulator element including:
a substantially transparent electro-optic material having a surface oriented substantially perpendicular to the light beam;
a first electrode which constitutes the electrical input of the modulator element formed on the surface;
a second electrode formed on the surface spaced from the first electrode; and
means for applying a predetermined electrical potential to the second electrode.

13. A receiver as in claim 12, in which said means for applying the predetermined electrical potential to each second electrode comprises circuit means for connecting each second electrode to ground.

14. An electro-optic receiver, comprising:
electro-optic modulator means responsive to a temporal electrical input signal for producing a spatial optical pattern in which the transmittance varies in accordance with the temporal amplitude distribution of the input signal;

light source means for directing a coherent light beam through the modulator means for modulation by the optical pattern;

transformation means for transforming the modulated light beam into a spatial light distribution pattern in which the light intensity varies in accordance with the amplitudes of the frequency components of the input signal; and photodetector means for receiving the light distribution pattern from the transformation means and producing electrical output signals corresponding thereto;

the modulator means comprising:
a linear delay element array including a plurality of delay elements connected such that the input signal propagates sequentially therethrough; and
a linear electro-optic modulator array including:

a substantially transparent electro-optic material having a surface oriented substantially perpendicular to the light beam;

a plurality of first and second electrodes alternatingly formed on the surface, with spaces between adjacent first and second electrodes, the first electrodes being connected in circuit with electrical outputs of the delay elements respectively;

means for applying a predetermined electrical potential to the second electrodes;

first polarizer means disposed between the light source means and the modulator elements; and second polarizer means disposed between the modulator elements and the photodetector means, the first and second polarizer means polarizing the light beam at angles which are shifted substantially 90° relative to each other.

15. A receiver as in claim 14, in which said means for applying the predetermined electrical potential to the second electrodes comprises circuit means for connecting the second electrodes to ground.

16. An electro-optic modulator, comprising:

a tapped delay line means having an input connected in circuit for receiving an electrical input signal;

a linear electro-optic modulator array including:
   a substantially transparent material which exhibits the transverse electro-optic effect;
   a plurality of first and second electrodes alternatingly formed on a surface of the material, with spaces between adjacent first and second electrodes, the first electrodes being connected in circuit with taps of the delay line means respectively; and
   means for applying a predetermined electrical potential to the second electrodes;

the modulator further including light source means for directing a coherent light beam through the modulator array substantially perpendicular to the surface;

the material and predetermined potential being selected such that electric fields are created in areas between adjacent first and second electrodes due to differences between magnitudes of the output signals at the taps connected to the respective first electrodes and the predetermined potential applied to the second electrodes, said electric fields causing variation of birefringent refractive indices in the material and corresponding localized variation of polarization angles in said respective areas due to the transverse electro-optic effect.

17. A modulator as in claim 16, further comprising:

first polarizer means disposed between the light source means and the modulator array along the axis of the light beam; and second polarizer means disposed downstream of the modulator array along the axis of the light beam;

the first and second polarizer means polarizing the light beam at first and second polarization angles respectively which are shifted substantially 90° relative to each other;

he material and predetermined potential being selected such that polarization angles in the material between each adjacent first and second electrode vary due to the transverse electro-optic effect within the range between the first and second polarization angles in accordance with the output signal at the tap connected to the respective first electrode.

18. A modulator as in claim 16, in which said means for applying the predetermined electrical potential to the second electrodes comprises circuit means for connecting the second electrodes to ground.

19. A modulator as in claim 16, in which the material is selected from the group consisting of $LiNbO_3$ and $Bi_{12}SiO_{20}$.

* * * * *

UNITED STATES PATENT AND TRADEMARK OFFICE
CERTIFICATE OF CORRECTION

PATENT NO. : 5,105,380
DATED : April 14, 1992
INVENTOR(S) : YURI OWECHKO

It is certified that error appears in the above-identified patent and that said Letters Patent is hereby corrected as shown below:

Col. 8, line 66, delete "bear" and insert --beam--.

Col. 12, line 24, delete "he" and insert --the--.

Signed and Sealed this

Fifth Day of October, 1993

Attest:

BRUCE LEHMAN

Attesting Officer

Commissioner of Patents and Trademarks